Sept. 4, 1962 K. B. BREDTSCHNEIDER 3,052,473
FLANGED CLOSURE FOR PRESSURE VESSELS
Filed Oct. 22, 1959
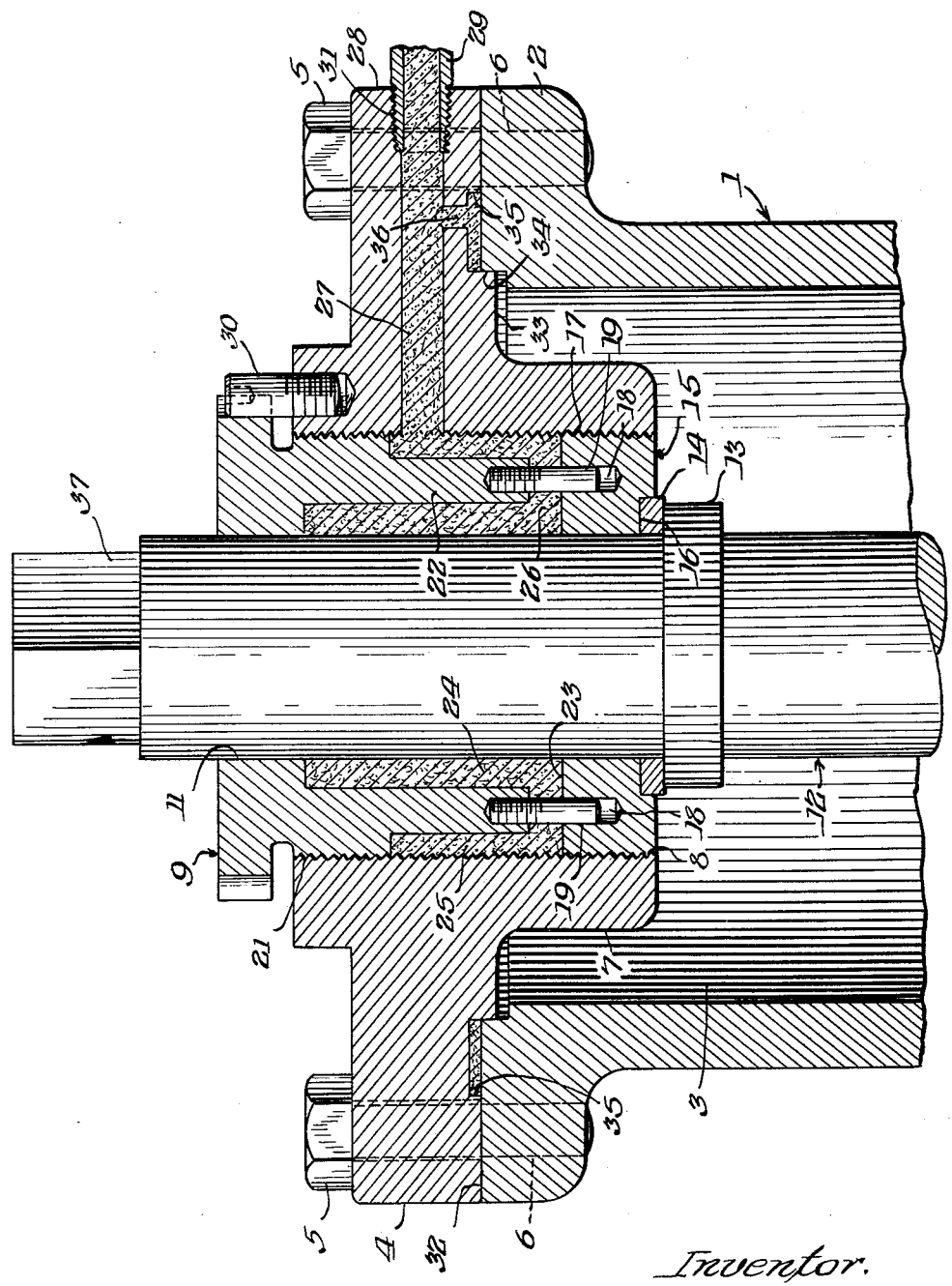
Inventor.
Kurt B. Bredtschneider.
By Joseph O. Lange
Atty.

United States Patent Office 3,052,473
Patented Sept. 4, 1962

3,052,473
FLANGED CLOSURE FOR PRESSURE VESSELS
Kurt B. Bredtschneider, Chicago, Ill., assignor to Crane Co., Chicago, Ill., a corporation of Illinois
Filed Oct. 22, 1959, Ser. No. 848,025
8 Claims. (Cl. 277—74)

This invention relates generally to closure means for pressure vessels, such as valves, pumps, fittings, and the like. More particularly, it is concerned with the type of structure in which fluid sealing means are provided at a plurality of locations substantially simultaneously by employing a single means of introduction of the fluid sealing material.

Heretofore, especially where large valves or other pressure vessels, say, of the order of twelve inches (12") and larger, are used on pipe lines exposed to high fluid pressures or temperatures or both, the problem of providing suitable and effective sealing means at the bonnet or end flange connections has long been a serious one. Under the influence of extremely high fluid pressures or temperatures, conveniently maintaining fluid tightness at such locations has been difficult and this is particularly true where one of the elements forming at least a part of the closure member may be movable either axially or rotatably, or both, and in numerous cases even when the said parts are fixedly mounted.

Therefore it is one of the more important objects of this invention to provide a pressure vessel closure means in which the fluid sealing of the joint is not only effective but also easily, quickly and conveniently provided, and new packing can be added simultaneously to all sealing areas of the closure means.

A further object is to provide for a fluid tight flanged joint in which the connecting bolting employed is augmented by convenient sealing media to assist in making a fluid tight joint.

Another object is to provide for a vessel closure fluid sealing arrangement in which the chambers carrying the fluid sealing media are substantially unchanged in their dimensions, while at the same time permitting extremely high pressure loads to be applied by the packing or sealing media contained within such chambers.

A further object is to provide for a convenient adjustment in which the volume or cubical contents of at least one of the interconnected fluid sealing chambers can be quickly adjusted to a desired position.

Other objects and advantages will be more readily apparent upon proceeding with the description read in light of the accompanying drawing, in which the single FIGURE depicts a preferred embodiment of our invention.

Directing attention now to the said figure, a pressure vessel, such as a valve having the casing or body generally designated 1 and with its upper end portion provided with an annular flange 2 preferably integral with the casing 1 is shown. The valve chamber 3 has its upper limits defined by a closure flange 4 held in place by a plurality of bolts 5 annularly arranged on a suitable bolt circle to engage abuttingly as at 6 the annular flange 2. The flange member 4 preferably has an inwardly extending hub portion 7 having the internal threads 8 to receive the adjustable threaded bushing generally designated 9. The threads 8 preferably extend continuously for the full height of the closure member 4. The threaded bushing 9 being suitably formed with an inwardly turned annular bearing portion 11 receives the valve stem or shaft generally designated 12 which obviously may be connected to a wide variety of valve elements useful in controlling fluid flow therethrough, as, for example, a valve disc, valve gate, valve rotary plug, such as in a lubricated plug valve, for example, or a throttle or needle valve, or other valve flow control elements (not shown). Thus, it should be apparent that the valve stem or shaft 12 may be moved either reciprocally or rotatably, or with a combination of both types of movement, without adversely affecting the functioning of this invention as hereinafter made clear.

In the general embodiment illustrated, the valve stem 12 is indicated as being of the rotatable type, and in this connection it has the integral annular shoulder 13 normally bearing transversely against the insert washer 14. The latter member is preferably composed of a wear-resisting material suitable for assuming the axial thrust of the valve stem. A base bushing generally designated 15 is mounted within the flange 4 as shown and is recessed as at 16 to receive the said wear-resisting washer, the said bushing being threaded as at 17 and apertured on an upper surface portion as at 18 to slidingly receive the depending pins 19 functioning in a manner as to hold the bushings 9 and 15 non-rotatively relative to each other. However, it should be understood that the threaded bushing 9 and the base bushing 15 can be combined and made in one piece under some circumstances with packing communicating holes taking the place of the pins 19.

The adjustably positioned bushing 9 is threaded at 21 for engagement with the threads 8 of the flange 4. Below the threads 21, it is provided with the annular depending reduced portion 22. The latter extension is of such proportions and form so as to partition the packing chamber defined transversely by the upper annular surface 23 of bushing 15 into inner and outer annular spaces 24 and 25 respectively, joined at their lower limits by the annularly extending chamber 26 as indicated. It will be appreciated that the heights of the respective annular chambers 24 and 25 together with the transverse chamber 26 are defined by the length of the engagement of the bushing threads 21 within the threaded recess 8 and thus establishes the capacity of the communicating space 26 between said annular chambers 24 and 25. When such packing or sealing space has been established and the adjusting bushing 9 is in the desired rotative position, locking pin 30 is applied which thus holds the bushings 9 against relative rotation on its threads 21. It thereby fixes as aforesaid the dimensions of the packing chamber defined by the numerals 24, 25, and 26.

In order to supply the said elements with the plastic packing, which is preferably used for such purpose, although other sealing means may of course be employed, the radially extending passage 27 is provided which extends transversely through the flange 4 continuously from the threads 8 outwardly to the flange periphery 28 having a suitably packing feed connection 29 threadedly or otherwise attached as at 31 as shown. It will be noted that the flange 4 preferably makes a direct abutting contact on the annular surface 32 of the integral flange 2. The said flange also has an annular tongue 33 preferably closely fitted within the recess defined by the annular surface 34 whereby to guide the flange 4 into position.

The underside of the flange 4 is provided with an annular packing recess 35 with its inner peripheral limit defined by the surface 34 and extending continuously around the annular projection 33 as shown. A vertical extending bypasses passage 36 connects the radial feed passage 27 with the said recess above defined.

Thus, it will now be clear that as the plastic packing is introduced into the radially extending passage 27 from feed member 29, it will fill the annular chamber at 35 through the said vertical supply aperture 36, while at the same time by continuing to operate the packing feed also filling the packing chambers at 24, 25, and 26. It will further become apparent that any time when it is indicated, as say, by fluid leakage, that the chamber at 35 requires packing renewal or replacement or that the chambers 24, 25, and 26 are similarly in need for an additional amount of plastic packing, it is only necessary to apply the packing from the single source at 29 to effect the desired packing addition or replacement.

It will, of course, also be clear that any fluid pressure building up within the valve chamber 3 because of fluid leakage occurring past the periphery of the chamber 34 will cause the plastic packing within the chamber 35 to be moved outwardly or away from the outer periphery of the extension 33, thus further increasing the fluid tightness because of the pressure sealing effected by the line fluid actually being carried within the vessel 1.

The advantages of such construction are clear in that it is possible not only to seal the stem or shaft 12 effectively on its peripheral limits, but also to provide a fluid tight seal for the threads 21 and consistently renewable gasket seal within the annular chamber between flanges 2 and 4 as defined at 35.

The shaft or valve stem 12 in the usual manner may have a square or other polygonal attachment at 37 for a wrench or handwheel for effecting its rotative actuation.

It has been found that for relatively large openings in pressure vessels for a bonnet, yoke or the like, this type of valve application offers new opportunities in accomplishing a very successful fluid tight seal without the need for removing the flange or breaking the connections between the end member 4 and the flanged vessel 1.

While only a single embodiment has been shown and described, it will, of course, be clear that other types of joints or connections may be used to draw the flanges 2 and 4 together as at 5 without affecting the application of this invention, the scope of which should be measured by the appended claims.

I claim:

1. In closure means for a pressure vessel, the combination of a casing therefor with an open end, a flange member mounted in abutting relation to the casing over said open end, the flange member having a substantially annular chamber between said flange member and that portion of the casing in abutting relation thereto, adjusting means engaging the said flange member, a second fluid sealing chamber defined at least in part by the said adjusting means, a shaft projecting through said second chamber to define the inner limits of the latter chamber, the said latter chamber being of substantially U-cross-section in communication with said first named chamber, and means for substantially simultaneously supplying a fluid sealing medium to both of said chambers, the said fluid supply means in its communication with the said second chamber having an iner end limit thereof defined by an outer peripheral portion of the said adjusting means whereby to seal said latter portion.

2. In closure means for a pressure vessel, the combination of a casing therefor with an open end, a flange member with an opening therein and mounted in abutting relation to the casing over said open end, an adjusting bushing axially movable predeterminately in the flange member opening, a shaft extending through the said bushing, the flange member having an annular chamber between said flange member and that portion of the casing in abutting relation thereto, a second fluid sealing chamber in said flange member in communication with said first named chamber, means in said flange member for supplying a fluid sealing medium to both of said chambers, the said second chamber being of substantially U-configuration having inner and outer annularly disposed leg portions in which one leg portion of the said chamber seals a peripheral portion of the shaft and the other leg portion seals the flange opening in which said bushing is mounted and follower means therefor having an annular projecting portion defining the legs of the said U-configuration of the said second chamber.

3. In closure means for a pressure vessel, the combination of a casing therefor with a flange having an open end, a second flange member mounted in abutting relation to the casing flange and over said open end, the first flange member having a chamber between said flange member and the flanged portion of the casing in abutting relation thereto and extending around said opening, a second fluid sealing chamber within the said casing flange in communication with said first named chamber, a shaft defining the inner limits of the second chamber, axially movable adjustable means for varying the capacity of the second named chamber and a common means for supplying a fluid sealing medium to both of said chambers, the said adjustable means forming a partition of annular wall configuration projecting within the second chamber to divide the chamber into inner and outer portions, the latter portions being connected at their inner end limits by an annular chamber substantially equal to the combined width of said inner and outer portions.

4. In closure means for a pressure vessel, the combination of a casing therefor with a flanged portion having an open end, a flange member mounted in substantial abutting relation to the casing flange over said open end, the flange member having a shallow annular chamber interposed between said flange member and that portion of the casing in abutting relation thereto, a second fluid sealing chamber of U-configuration in the said flange member in communication with said first named chamber at the outer leg of the chamber of U-configuration, the said latter chamber being adjustable relative to fixing its capacity at its open end portion, an annular follower for effecting said adjustment, and a means with a bypass passage portion communicating with said shallow chamber for supplying a fluid sealing medium to the said chambers substantially simultaneously, a shaft within said open end defining the inner limits of the inner leg of the chamber of U-configuration.

5. In closure means for a pressure vessel, the combination of a casing therefor with a flanged open end, a flanged member attached in substantially abutting relation to the casing over said casing open end, an annular chamber between said flange member and that flanged portion of the casing attached in abutting relation to the casing, a second fluid sealing chamber centrally positioned in the said flange member in communication with said first named chamber, axially movable adjustable follower means for said centrally positioned chamber to define the desired length of fluid sealing surfaces within inner and outer peripheral portions of said latter chamber, and means having a passage communicating with said annular chamber for supplying a fluid sealing medium to the said chambers substantially simultaneously, a shaft extending through said adjustable follower means and defining the inner periphery of the second fluid sealing chamber and an inner periphery of said adjustable follower means.

6. In a closure means for a pressure vessel, the combination of a casing therefor with a flanged open end, a flange member having an annular surface in abutting relation to the casing over said open end, an annular chamber within the area defined by the flange member annular surface in abutting relation between said flange member and within the periphery of the flanged open end portion of the casing, a second fluid sealing chamber of substantially U-configuration in cross-section in the said flange member in communication with said first named chamber, a shaft defining the inner perimetral limits of the chamber of U-configuration for the length of said chamber, a follower axially movable within said flange member for defining the depths of each of said chambers, and means for supplying a fluid sealing medium to the said chambers substantially simultaneously connecting the first chamber with the second fluid sealing chamber.

7. The subject matter of claim 5, the said adjustable means including a second member slidably movable and in spaced apart relation axially to the adjustable means and being normally fixed relative to said adjustable means to provide a transversely extending space therebetween, the said adjustable follower means having a connection with said second member predeterminately permitting adjustment of the volume of the second chamber upon actuation of said adjustable means.

8. The subject matter of claim 5, the said adjustable means having a depending annular reduced inner end portion providing coaxial annular spaces within said centrally positioned second fluid chamber, the latter chamber having threads defining its outer periphery for its full length for receiving said adjustable follower means.

References Cited in the file of this patent

UNITED STATES PATENTS

| | | |
|---|---|---|
| 1,805,155 | Weeks | May 12, 1931 |
| 1,844,903 | Queen | Feb. 9, 1932 |
| 1,975,886 | Wheeler | Oct. 9, 1934 |
| 2,035,450 | Barnes | Mar. 31, 1936 |
| 2,075,148 | Svenson | Mar. 30, 1937 |
| 2,091,671 | Campbell et al. | Aug. 31, 1937 |
| 2,126,366 | Boyer | Aug. 9, 1938 |
| 2,485,497 | Lemley et al. | Oct. 18, 1949 |
| 2,504,496 | Carter | Apr. 18, 1950 |
| 2,624,601 | Else | Jan. 6, 1953 |